United States Patent [19]

Ebersberger et al.

[11] 4,295,049
[45] Oct. 13, 1981

[54] X-RAY DIAGNOSTIC GENERATOR WITH AN INVERTER SUPPLYING THE HIGH-TENSION TRANSFORMER

[75] Inventors: Otto Ebersberger, Erlangen; Werner Kuehnel, Uttenreuth, both of Fed. Rep. of Germany

[73] Assignee: Siemens Aktiengesellschaft, Berlin & Munich, Fed. Rep. of Germany

[21] Appl. No.: 117,549

[22] Filed: Feb. 1, 1980

[30] Foreign Application Priority Data

Mar. 6, 1979 [DE] Fed. Rep. of Germany ....... 2908767

[51] Int. Cl.³ .............................................. H05G 1/32
[52] U.S. Cl. .................................................. 250/409
[58] Field of Search ................................ 250/408, 409

[56] References Cited

U.S. PATENT DOCUMENTS 4,171,488  10/1979  Kuehnel ............................ 250/408
4,221,968  9/1980  Franke ................................ 250/409

FOREIGN PATENT DOCUMENTS 2443709  3/1976  Fed. Rep. of Germany .

Primary Examiner—Alfred E. Smith
Assistant Examiner—T. N. Grigsby
Attorney, Agent, or Firm—Hill, Van Santen, Steadman, Chiara & Simpson

[57] ABSTRACT

In an exemplary embodiment a direct-current supply with adjustable d.c. voltage supplies an inverter which in turn drives the high-tension transformer. High-tension capacitors are connected at the output of the high-tension rectifier, and control loops are provided for the x-ray tube voltage and the x-ray tube current. The controlled variable is the inverter frequency in the control loop for the x-ray tube voltage. There is a program storage in which an optimum d.c. voltage for the inverter input is programmed for each pair of settings of x-ray tube voltage and current. There can be a function generator present which before the start of the radiograph supplies a control signal corresponding to an inverter input voltage lying a predetermined amount above the respective programmed value. The inverter input voltage may be regulated by a feedback control loop, and the set point value from program storage may be temporarily increased by the function generator at the start of a radiograph.

10 Claims, 4 Drawing Figures

X-RAY DIAGNOSTIC GENERATOR WITH AN INVERTER SUPPLYING THE HIGH-TENSION TRANSFORMER

BACKGROUND OF THE INVENTION

The invention relates to an x-ray diagnostic generator with an inverter supplying the high-tension transformer, the inverter input is connected to a direct current supply with adjustable d.c. voltage; a high-tension rectifier is connected at the output of the high-tension transformer, and high-tension capacitors are connected at the output of the high-tension rectifier; control loops are provided for the x-ray tube voltage and the x-ray tube current.

In an x-ray diagnostic generator of this kind it is possible to select the supply frequency of the x-ray tube in the kilohertz (kHz) range, i.e. substantially higher than the mains (commercial power) frequency. As a result of this high supply frequency the high-tension transformer can have an essentially smaller and lighter construction than in the case of an x-ray diagnostic generator which is powered with the mains frequency.

In this case a series resonant circuit can be provided in the load circuit of the inverter for supplying the x-ray tube. In the case of an inverter of this kind there is a close correlation between the set x-ray tube voltage, the x-ray tube current, the switching time, i.e. the exposure time, the ripple of the x-ray tube voltage and the magnitude of the direct voltage supplying the inverter.

At constant d.c. inverter supply voltage and constant x-ray tube voltage, the ripple decreases as the x-ray tube current increases. By contrast, the charging of the high-tension capacitors at the start of a radiographic exposure takes place more slowly. If on the other hand, x-ray tube voltage and x-ray tube current are held constant and the d.c. inverter supply voltage varies, the ripple of the high-tension voltage at the x-ray tube increases with increasing d.c voltage since more energy reaches the high-tension capacitors per charging pulse than when the d.c inverter supply voltage is lower. Thus the charging time of the high-tension capacitors and consequently the switching time decreases with the higher d.c inverter supply voltage.

In order to maintain a ripple at the output of the high-tension capacitors which is as small as possible, it is appropriate to keep the d.c. voltage supplying the inverter as small as possible. The limit for this is that the set combination of x-ray tube voltage and x-ray tube current can still be produced. On the other hand, the d.c. voltage supplying the inverter should lie above this threshold value - at least at the start of a radiographic exposure - in order to achieve a shorter charging time.

The result is that a certain optimum value of the d.c. voltage at the inverter input appertains to each combination of x-ray tube voltage and x-ray tube current, at which an optimum ripple of the x-ray tube voltage results.

SUMMARY OF THE INVENTION

The underlying object of the invention is to develop an x-ray tube diagnostic generator of the type cited in the introduction in such a manner that to each desired value of x-ray voltage and x-ray tube current the respective optimum value of the d.c. voltage at the inverter input is automatically set.

The object is solved according to the invention in that the controlled variable is the inverter frequency in the control loop for the x-ray tube voltage, that there is a program storage in which an optimum d.c. voltage for the inverter input is programmed for each set pair of values of x-ray tube voltage and current and that there are means for setting this d.c. voltage in dependence upon the programmed values. In the x-ray diagnostic generator according to the invention, the control of deviations of the high-tension voltage from the set point value takes place by way of the inverter frequency. The theoretical value of the optimum d.c voltage is specified for each given value pair for x-ray tube voltage and current by way of the program storage, which can be a component of a microcomputer. The programming of the program storage take place once in dependence upon a table established, for example, by tests.

An appropriate embodiment of the invention provides that means for setting the inverter input voltage lie in a control loop. In this case it is possible to provide a function generator at the theoretical optimum value input of the control loop which, before the start of the radiographic exposure, specifies a d.c. voltage lying a pre-determined amount above the respective programmed value. Due to this d.c. voltage lying, for example, in each case approximately 10% above the respectively programmed value, a quick charging of the high-tension capacitors takes place and hence with the same dose a shorter switching time is realized than in the case in which the output signal of the program storage is constantly connected to the input of the control loop for the d.c. voltage at the inverter input. According to a further embodiment, the control loop for the d.c voltage adjustment also allows a function generator to be connected at the theoretical optimum value input of this control loop which at the start of a radiographic exposure temporarily increases the programmed theoretical value for the direct voltage. Voltage interruptions at the inverter input and hence possibly occurring voltage interruptions at the x-ray tube are prevented by this temporary increase. The two function generators can here comprise RC combinations which, on the one hand, effect the increase of the theoretical value for the direct voltage before the start of the radiographic exposure and, on the other hand, effect the increase of the theoretical value with the start of the radiographic exposure.

The invention is explained in greater detail in the following in conjunction with an exemplary embodiment represented on the accompanying sheets of drawings; and other objects, features and advantages of the invention will be apparent from this detailed disclosure, and from the appended claims.

DETAILED DESCRIPTION

Figure 1:
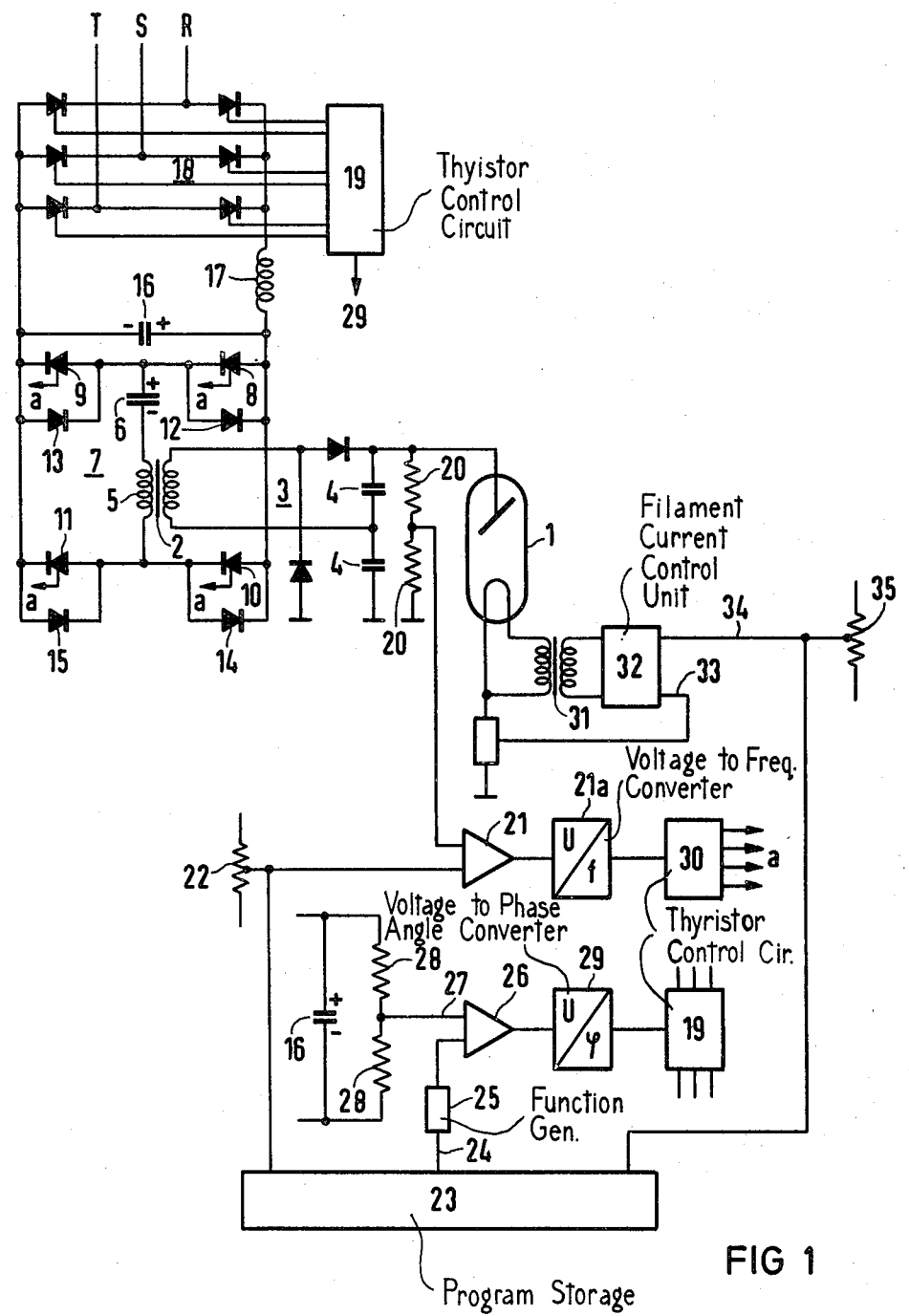
FIG. 1 shows a circuit diagram of x-ray diagnostic generator according to the invention.

In FIG. 1 an x-ray tube 1 is shown which is supplied from a high-tension transformer 2 by way of a high-tension rectifier circuit 3 which has two capacitors 4, which serve to double the x-ray tube voltage in comparison to the secondary voltage of the high-tension transformer 2. The primary winding 5 of the high-tension transformer 2 forms together with an oscillatory capacitor 6 a series resonant circuit which lies in the diagonal of an inverter 7. The inverter 7 has four thyristors 8 to 11 which are bridged by free-running diodes 12 to 15. Its input voltage is taken across a capacitor 16 of a filter section which in addition has an inductor 17. A three-phase current rectifier bridge 18, serving the charging of the capacitor 16, has controllable rectifiers, i.e. thyristors for example, which are connected to a control circuit 19.

For the purpose of controlling the x-ray tube voltage, a voltage divider 20, the actual value signal of which is supplied to a regulator 21, is connected in parallel to the x-ray tube 1 for detecting the actual value. On the other hand, a set point value signal for the x-ray tube voltage is supplied by a set point value transmitter 22 to the regulator 21. The regulator 21 supplies at its output a signal corresponding to the difference between the actual and the set point value of the x-ray tube voltage to a voltage-frequency converter 21a which establishes the frequency with which diagonally opposite pairs of the thryistors 8 to 11 are ignited alternately. The x-ray tube voltage taken off at the high-tension capacitors 4 is dependent upon this inverter frequency.

As there is an optimum value of the input voltage of the inverter 7 for each desired value of the x-ray tube power, a signal corresponding to the set point value for the x-ray tube voltage is supplied to a microcomputer operated to provide storage 23 in which the optimum voltage at the capacitor 16 is stored for each set pair of values of x-ray tube voltage and current. A signal corresponding to this optimum voltage is supplied at output 24 to a regulator 26 by way of a function generator 25, said regulator obtaining at its input 27 a signal which is taken off at an actual value transmitter 28 for representing the actual value of the voltage at the capacitor 16. The regulator 26 alters by way of a mains-related phase-gating control device 29 and the control circuit 19 the firing angle of the rectifier 18, i.e. it sets the pulses which are switched through to the capacitor 16 by way of the phase-gating in such a manner that the capacitor voltage for each set pair of values of x-ray tube voltage and current has the optimum value.

The thyristors 8 to 11 are ignited alternately in pairs in the inverter 7. If, for example the thyristors 8 and 11 are ignited by means of a control circuit 30 the capacitor 6 is charged with the indicated polarity. When the charging has terminated, the resonant circuit 5, 6 produces reverse current flow by way of the free-running diodes 12, 15 whereby the thyristors 8 and 11 are extinguished. The thyristors 9 and 10 can now be rendered conductive, whereby the capacitor 6 is charged with an opposite polarity relative to its illustrated polarity. With a further reversal of current flow, the thyristors 9 and 10 are extinguished because the load current flows through the free-running diodes 13 and 14. After this the thyristors 8 and 11 can be ignited again, etc.

A filament current control unit 32 is connected with a heating transformer 31 for controlling the x-ray tube current, an actual value signal for the x-ray tube current being supplied to said control unit at an input 33, while a set point value signal for the x-ray tube current is connected at the input 34. This set point value signal is taken off at a set point value transmitter 35 and also controls the program storage 23. The program storage 23 can thus determine the d.c. voltage at the input of the inverter 7 in dependence upon the set values for x-ray tube voltage and current.

Figure 2:
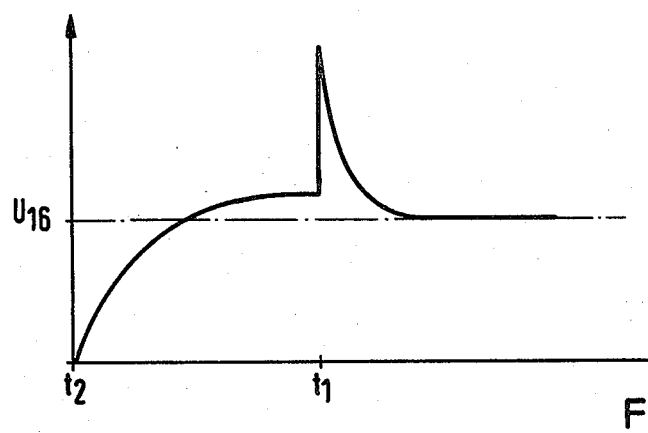
FIG. 2 shows a voltage variation as a function of time to explain FIG. 1.

FIG. 2 shows the influence of the optimum value signal supplied from the program storage 23 at the output 24 by means of the function generator 25. Basic to the example of FIG. 2 is the assumption that the program storage 23 ascertains a capacitor voltage U16 of 400 volts as the optimum value corresponding to a specified pair of values for the set x-ray tube voltage and the x-ray tube current. This value U16 is shown as a broken line in FIG. 2. Two contacts are activated one after the other in order to start a radiographic exposure. When activating the first contact, a pre-contact 42, FIG. 3, first of all a voltage lying approximately 10% above the optimal value of 400 volts is given by means of the function generator 25. This increase in the capacitor voltage of the capacitor 16 before the start of the radiographic exposure has the effect that the charging of the high-tension capacitors 4 takes place very quickly after the start of the radiographic exposure and consequently a shorter switching time is achieved at the same dose than in the case in which the capacitor 16 is charged before the start of the radiographic exposure to the desired voltage of 400 volts.

Furthermore at the instant t1 at which the radiographic exposure is started by closing the second contact 41 of the radiographic starter circuit, a voltage peak is produced by means of the function generator 25 which after a short time dies away to the optimum value of 400 volts. This voltage peak prevents a voltage interruption at the capacitor 16 and consequently a voltage interruption of the x-ray tube voltage from occurring through the connection of the load 4 at the start of the radiographic exposure.

Figure 3:
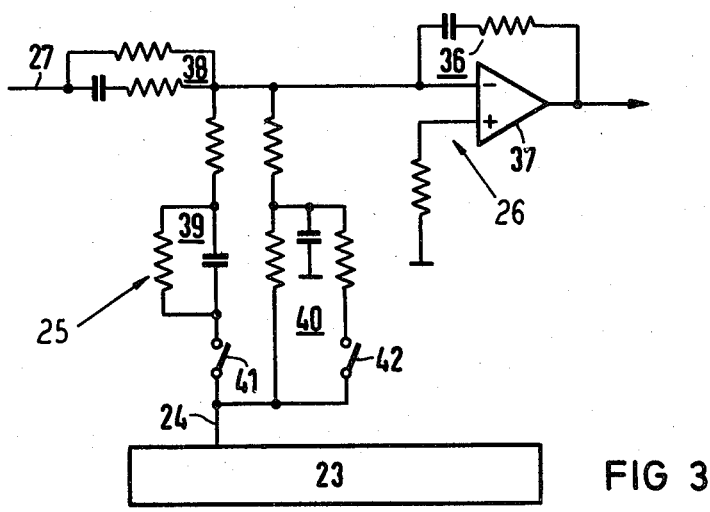
FIG. 3 shows circuit details of the x-ray diagnostic generator according to FIG. 1.
Figure 4:
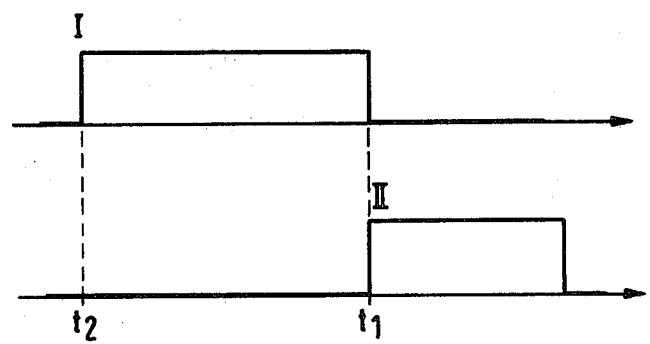
FIG. 4 shows waveforms as a function of time to explain the timing of switch operation in FIG. 3.

The construction of the function generator 25 is shown in FIG. 3. It can be seen from FIG. 3 that the regulator 26 comprises an operational amplifier 37 with an RC feedback network 36, the actual value signal for the voltage at the capacitor 16 being supplied to said operational amplifier by way of an RC network 38, on which the optimum value signal of the program storage 23 is superimposed as current. This superposition takes place by way of two RC sections 39, 40 which are controlled by means of switches 41, 42. When activating the pre-contact 42 at the instant t2 in order to start a radiographic exposure, the capacitor of the RC-section 40 is charged corresponding to the portion of the curve between the instants t1 and t2 in FIG. 2. With the start of the radiographic exposure at the instant t1 the switch 41 is closed, the switch 42 opened and the capacitor of the RC-section 39 produces immediately after the instant t1 the peak shown in FIG. 2 at the input of the operational amplifier 37. The duration of the closure of the switch 41 is proportioned in such a manner that this peak has already died away before the switch 41 is opened. Accordingly, the switch 42 in accordance with the curve I in FIG. 4 is closed between the instants t2 and t1 and the switch 41 following the instant t1 is closed for a time of approximately 40 milliseconds in accordance with the curve II in FIG. 4.

The described x-ray diagnostic generator makes possible with a small and light-weight high-tension transformer an exact maintenance of the x-ray tube voltage with extremely slight ripple. The x-ray tube current control takes place in a known manner by means of semi-conductor components in the heater filament circuit of the x-ray tube 1.

For the case where during a radiograph the x-ray tube current is decreased exponentially in order to achieve an optimum loading of the x-ray tube, it is particularly expedient also to lower correspondingly the d.c. voltage for the inverter input (initial loading operation).

It will be apparent that many modifications and variations may be effected without departing from the scope of the novel concepts and teachings of the present invention.

SUPPLEMENTAL DISCUSSION

By way of example, with the illustrated embodiment the initiation of an exposure operation at time $t_2$, FIG. 2, may involve the supply of three-phase power to the phases RST indicated in FIG. 1. At time $t_2$, FIG. 2, capacitor 16 will have a zero charge, and pre-contact 42, FIG. 3, of function generator 25 will be closed. The extra current supplied via contact 42 to amplifier 37 results in a set point voltage value corresponding to say 440 volts at capacitor 16 (ten percent above the optimum $U_{16}$ value of say 400 volts). A timing circuit may hold the contact 42 closed for a time duration corresponding to the maximum of the charging time for charging capacitor 16 to the respective desired increased voltages above the given set of optimum values represented by the range of set point values contained in the storage 23. At the end of this timing cycle, contact 41 is closed (for forty milliseconds), and contact 42 is opened, as represented by timing diagrams II and I in FIG. 4. At the time $t_1$ the inverter 7 may be placed in operation, and the peak capacitor voltage across capacitor 16, following time $t_1$ in FIG. 2, which is substantially greater than 440 volts in the given example, insures against any voltage interruption at the input of inverter 7 at the start of the radiographic exposure. The exposure may be terminated when the set dosage has been reached, and at this time, the three phase supply to phases R, S, T in FIG. 1 may again be interrupted and the inverter thyristors 8-11 placed in a continuously blocking (nonconducting) mode.

We claim as our invention

1. An x-ray diagnostic generator comprising
   an inverter having an input and an output and having a controllable frequency of operation,
   a high tension transformer having an input connected with the output of the inverter, and having an output,
   a high tension rectifier having an input connected with the output of the high tension transformer, and having an output,
   high tension capacitors connected at the output of the high tension rectifier,
   control loop means for receiving respective pairs of set point value signals in accordance with respective settings of x-ray tube voltage and current, and operable for sensing actual value signals in accordance with actual values of x-ray tube voltage and current and for controlling x-ray tube voltage and current to minimize errors between the settings of x-ray tube voltage and current, and the actual values thereof,
   said control loop means comprising x-ray tube voltage control means (7, 20, 21, 21a, 30) connected with said inverter and operable to control inverter frequency to minimize the error between an x-ray tube voltage set point value signal and an x-ray tube voltage actual value signal, and
   direct current supply means (16-19) connected with the input of said inverter (7) and operable for controlling the voltage supplied to said inverter,
   program storage means (23) for supplying an optimum value signal in accordance with an optimum value of inverter input voltage for each pair of settings of x-ray tube voltage and current to be received by said control loop means, and
   inverter input voltage control means (24-29) connected with said direct current supply means (16-19) for setting the voltage supplied to said inverter (7) and connected with said storage means (23) and responsive to the optimum value signal therefrom to set the inverter input voltage at an optimum value during an operation of said generator with corresponding settings of x-ray tube voltage and current.

2. An x-ray diagnostic generator according to claim 1, with said direct current supply means comprising rectifier bridge means (18,19) having controllable rectifiers controlled by said inverter input voltage control means (24-29) and capacitor means (16) interposed between said rectifier bridge means and the input of said inverter (7) for charging to an inverter input voltage in accordance with the optimum value signal from said program storage means (23).

3. An x-ray diagnostic generator according to claim 1 with said inverter input voltage control means comprising a feedback control loop and being responsive to errors between a signal representing the actual value of inverter input voltage and a signal responsive to said optimum value signal for controlling the inverter input voltage to minimize such errors.

4. An x-ray diagnostic generator according to claim 3, with said inverter input voltage control means having actual value means (28) connected with said capacitor means (16) for sensing the actual value of inverter input voltage and being responsive to errors between the signal from said actual value means (28) and a signal responsive to said optimum value signal for controlling the inverter input voltage to minimize such errors.

5. An x-ray diagnostic generator according to claim 1, with said inverter input voltage control means comprising a function generator (25) operable before the start of an exposure operation of said diagnostic generator to control said direct current supply means (16-19) to supply a voltage to the input of the inverter (7) which is above the optimum value by a predetermined amount.

6. An x-ray diagnostic generator according to claim 2, with said inverter input voltage control means comprising a function generator (25) operable before the start of an exposure operation of said diagnostic generator to control said direct current supply means (16-19) to supply a voltage to the input of the inverter (7) which is above the optimum value by a predetermined amount equal to at least about ten percent of said optimum value.

7. An x-ray diagnostic generator according to claim 3, with said inverter input voltage control means comprising a function generator (25) operable before the start of an exposure operation of said diagnostic generator to control said direct current supply means (16-19) to supply a voltage to the input of the inverter (7) which is above the optimum value by a predetermined amount equal to at least about ten percent of said optimum value.

8. An x-ray diagnostic generator according to claim 1, with said inverter input voltage control means comprising a function generator (25) connected with said program storage means for receiving said optimum value signal therefrom, and operable at the start of a radiographic exposure operation to temporarily increase the setting of the inverter input voltage above the corresponding optimum value.

9. An x-ray diagnostic generator according to claim 2, with said inverter input voltage control means comprising a function generator (25) connected with said program storage means for receiving said optimum value signal therefrom, and operable at the start of a radiographic exposure operation to temporarily increase the setting of the inverter input voltage above the corresponding opitmum value by substantially more then ten percent of said optimum value.

10. An x-ray diagnostic generator according to claim 3, with said inverter input voltage control means comprising a function generator (25) connected with said program storage means for receiving said optimum value signal therefrom, and operable at the start of a radiographic exposure operation to temporarily increase the setting of the inverter input voltage above the corresponding optimum value by substantially more than ten percent of said optimum value.

* * * * *